(12) United States Patent
Ellis

(10) Patent No.: US 10,910,874 B2
(45) Date of Patent: Feb. 2, 2021

(54) PORTABLE POWER SUPPLY

(71) Applicant: Worldwide Energy LLC, Oak Park, MI (US)

(72) Inventor: Raymond Ellis, Monroe, MI (US)

(73) Assignee: Worldwide Energy LLC, Oak Park, MI (US)

( * ) Notice: Subject to any disclaimer, the term of this patent is extended or adjusted under 35 U.S.C. 154(b) by 19 days.

(21) Appl. No.: 16/229,451

(22) Filed: Dec. 21, 2018

(65) Prior Publication Data
US 2019/0207416 A1  Jul. 4, 2019

Related U.S. Application Data

(60) Provisional application No. 62/612,780, filed on Jan. 2, 2018, provisional application No. 62/612,788, filed on Jan. 2, 2018.

(51) Int. Cl.
*H02J 9/06* (2006.01)
*H02J 1/10* (2006.01)
(Continued)

(52) U.S. Cl.
CPC .............. *H02J 9/061* (2013.01); *G06F 1/263* (2013.01); *H02J 1/10* (2013.01); *H02M 7/003* (2013.01); *H02J 3/001* (2020.01)

(58) Field of Classification Search
CPC ...... H02J 9/06; H02J 9/061; H02J 7/02; H02J 7/025; H02J 7/00; H02J 1/10; G06F 1/16;
(Continued)

(56) References Cited

U.S. PATENT DOCUMENTS 5,268,850 A  12/1993  Skoglund
5,895,981 A   4/1999  Flegel
(Continued)

FOREIGN PATENT DOCUMENTS

WO   2016123283 A1   8/2016

OTHER PUBLICATIONS

Invitation to Pay Additional Fees for Application No. PCT/US2018/067172, dated Feb. 8, 2019, 2 pages.
(Continued)

*Primary Examiner* — Rexford N Barnie
*Assistant Examiner* — Jagdeep S Dhillon
(74) *Attorney, Agent, or Firm* — Brooks Kushman P.C.

(57) ABSTRACT

A mobile power supply unit includes a base and a housing including at least one housing member secured to the base and movable relative to the base. The mobile power supply unit further includes a generator disposed within the housing, and a battery disposed within the housing. The mobile power supply unit further includes an inverter electrically connected to the generator and the battery, and an electronics enclosure including an electrical port, and a transfer switch electrically connected to the inverter and adapted to provide power through the electrical port. The mobile power supply unit further includes a portable transfer switch having a first electrical cable selectively electrically connectable to the electrical port and a second electrical cable selectively electrically connectable with a power receptacle of a building.

20 Claims, 8 Drawing Sheets

(51) Int. Cl.
*G06F 1/26* (2006.01)
*H02M 7/00* (2006.01)
*H02J 3/00* (2006.01)

(58) Field of Classification Search
CPC ........ G06F 1/263; H02M 7/003; H01R 25/00;
A61N 1/39; F16M 11/10; F16M 11/22
USPC ......... 307/66, 64, 82, 43, 65, 31, 35, 38, 39
See application file for complete search history.

(56) References Cited

U.S. PATENT DOCUMENTS

| | | | |
|---|---|---|---|
| 6,172,432 B1 * | 1/2001 | Schnackenberg | H02J 3/14 307/23 |
| 6,873,137 B2 | 3/2005 | Fa | |
| 6,930,410 B2 * | 8/2005 | Ikeda | B60L 53/305 307/140 |
| 7,547,990 B2 | 6/2009 | Varzhabedian | |
| 7,781,913 B2 * | 8/2010 | Wang | H02J 9/062 307/64 |
| 8,707,452 B1 * | 4/2014 | Block | G06F 21/41 726/28 |
| 8,810,081 B1 * | 8/2014 | Flegel | H01R 13/447 307/328 |
| 2003/0201672 A1 * | 10/2003 | Stranberg | H02J 9/06 307/66 |
| 2008/0042625 A1 * | 2/2008 | Konop | F02B 77/13 322/1 |
| 2008/0084187 A1 | 4/2008 | Cutrona | |
| 2008/0179959 A1 * | 7/2008 | Folken | H02J 3/38 307/80 |
| 2012/0112544 A1 * | 5/2012 | Salcone | H02J 7/0047 307/65 |
| 2015/0022001 A1 | 1/2015 | Goei et al. | |
| 2015/0216273 A1 * | 8/2015 | Akin | H02J 7/025 135/16 |
| 2018/0055175 A1 * | 3/2018 | Rho | A45C 15/00 |
| 2018/0278086 A1 * | 9/2018 | Hall | H02J 9/00 |
| 2018/0369599 A1 * | 12/2018 | Smith | A61N 1/3904 |

OTHER PUBLICATIONS

International Search Report and Written Opinion for Application No. PCT/US2018/067172, dated Apr. 25, 2019, 10 pages.
Xantrex Technology Inc. Xantrex 8080915 PROwatt SW Auto Transfer Switch. 2011. [retrieved on Apr. 1, 2019]. Retrieved from the Internet. <URL: https://www.amazon.com/Xantrex-8080915-PROwatt-Transfer-Switch/dp/B004S5Y158/ref=pd_lpo_vtph_263_bsip_t_1?_encoding=UTF8&psc+1&refRID=D4EDDW9451E3FM32JW82>., 13 pages.
Four Star Solar Rolling Thunder RT-1000 Product Description, https://www.wholesalesolar.com/1441002/four-star-solar/battery-backup-systems/four-star-solar-rolling-thunder-rt-1000, 3 Pages.
NYSEG, "Emergency Generator Safety," Installing and Operating Generators Brochure, 2003 New York State Electric & Gas Corporation, 8 Pages.

* cited by examiner

PORTABLE POWER SUPPLY

CROSS-REFERENCE TO RELATED APPLICATIONS

This application claims the benefit of U.S. Provisional Application No. 62/612,780, filed Jan. 2, 2018, and U.S. Provisional Application No. 62/612,788, filed Jan. 2, 2018, the disclosures of which are hereby incorporated in their entirety by reference herein.

TECHNICAL FIELD

The disclosure generally relates to portable power supply and, more particularly, to a portable power supply device and method of use.

BACKGROUND

In many instances, electricity may be unavailable in a building. For example, weather, environmental events, or other disasters may cause a building to lose power. Generators may be used to power individual appliances and other electrical components.

SUMMARY

In at least one approach, a mobile power supply unit is provided. The mobile power supply unit may include a base and a housing including at least one housing member secured to the base and movable relative to the base. The mobile power supply unit may further include a generator and a battery disposed within the housing. An inverter may be electrically connected to the generator and the battery. The mobile power supply unit may further include an electronics enclosure including an electrical port and a transfer switch electrically connected to the inverter. The transfer switch may be adapted to provide power through the electrical port. The mobile power supply unit may further include a portable transfer switch having a first electrical cable selectively electrically connectable to the electrical port and a second electrical cable selectively electrically connectable with a power receptacle of a building.

The base may include a top surface extending in a plane. The at least one housing member may be a top member rotatably secured to the base and rotatable within a plane perpendicular to the plane of the base.

The housing may further include a first and second side arms rotatably secured to the base and rotatable within a plane parallel to the plane of the base. In a first configuration, the first and second side arms may engage the base and the top member to form a substantially watertight seal. In a second configuration, at least one of the first side arm and second side arm may be rotated away from the top member to expose the battery.

The mobile power supply unit may further include a user interface secured to the housing member. The user interface may include a user input and a user display.

The electronics enclosure may further include a first authorization input. The portable transfer switch may further include a second authorization input. The first authorization input may be a first key receptacle. The second authorization input may be a second key receptacle. The first authorization input may be a plurality of key receptacles.

The base may be adapted to be secured to a bed portion of a vehicle.

In at least one approach, a mobile power supply unit is provided. The mobile power supply unit may include a housing and a power source disposed within the housing. The mobile power supply unit may include an inverter that may be electrically connected to the power source. The mobile power supply unit may include a first transfer switch that may be disposed within the housing and may be electrically connected to the inverter. The mobile power supply unit may include a second transfer switch that may have a first electrical cable, a second electrical cable, and a key receptacle. The first electrical cable may be selectively electrically connectable to an electrical port associated with the first transfer switch. The second electrical cable may be selectively electrically connectable with a power receptacle of a building.

The second transfer switch may be a portable second transfer switch disposed outside of the housing. The second transfer switch may further include an annunciation interface. The annunciation interface may include at least one light. The at least one light may include a first light-emitting diode adapted to emit a first color, and a second light-emitting diode adapted to emit a second color different than the first color.

The second transfer switch may further include a third electrical cable selectively electrically connectable with the power receptacle of the building.

The mobile power supply unit may further include a third transfer switch having a third electrical cable selectively electrically connectable to a second electrical port associated with the first transfer switch, a fourth electrical cable selectively electrically connectable with a second power receptacle of a second building, and a second key receptacle. The third transfer switch may be a portable third transfer switch disposed outside of the housing. The first transfer switch may be adapted to selectively provide power to the second transfer switch and the third transfer switch. The first transfer switch may be adapted to provide power to the second transfer switch in response to actuation of the key receptacle at the second transfer switch. The first transfer switch may be adapted to provide power to the third transfer switch in response to actuation of the second key receptacle at the third transfer switch.

In at least one approach, a method of operating a mobile power supply unit having at least one power source is provided. The method may include, at a user interface, receiving a request for power. The method may further include, responsive to receiving the request for power, by a controller, providing power from the power source through a first transfer switch disposed at the mobile power supply unit to a second transfer switch disposed away from the mobile power supply unit when a first key receptacle at the first transfer switch is in an actuated position, and a second key receptacle at the second transfer switch is in an actuated position.

The method may further include electrically connecting the second transfer switch to the first transfer switch with a first cable, and electrically connecting the second transfer switch to a power receptacle of a building with a second cable. The method may further include, responsive to receiving the request for power, by the controller, providing power from the power source through the first transfer switch to the second transfer switch when the first cable is an approved cable selected from a predetermined list of approved cables.

The method may further include receiving a user authentication input prior to providing power from the power source through the first transfer switch to the second transfer switch. In at least one approach, the user authentication input is at least one of a password or passcode received at the user interface.

The method may further include receiving an operation mode input prior to providing power from the power source through the first transfer switch to the second transfer switch. In at least one approach, the operation mode input may be a manual mode. In the manual mode, the controller may be adapted to provide power from the power source until the power source is reduced to a threshold power level.

In at least one approach, the operation mode input is a time-based mode. The method may further include receiving a user-input period of time at the user interface. In the time-based mode, the controller may be adapted to provide power from the power source for a period of time corresponding to the user-input period of time.

In at least one approach, the operation mode input is an energy-based mode. The method may further include receiving a user-input energy threshold at the user interface. In the energy-based mode, the controller may be adapted to provide power from the power source until the user-input energy threshold has been provided from the first transfer switch to the second transfer switch.

The method may further include receiving, at the user interface, a quiet mode input including a quiet mode time period. The quiet mode time period may be a time window having a user-input start time and a user-input end time. When a system time of the mobile power supply unit is not within the time window, the controller may be adapted to provide power from at least one of a generator and a battery through the first transfer switch to the second transfer switch. When the system time is within the time window, the controller may be adapted to provide power from the battery and not the generator. When the system time is not within the time window, the controller may be adapted to provide power from the battery when an operational time of the battery is greater than the quiet mode time period. When the system time is not within the time window, the controller may be adapted to provide power from the generator when the operational time of the battery is less than the quiet mode time period.

The method may further include, responsive to receiving the request for power, by the controller, providing power from a generator through the first transfer switch to the second transfer switch when a system time of the mobile power supply unit does not correspond to the quiet mode time period, and responsive to the system time corresponding to the quiet mode time period, switching the power source from the generator to the battery.

In at least one approach, a method of operating a mobile power supply unit having at least one power source is provided. The method may include, at a user interface, receiving a first request for power. The method may further include, responsive to receiving the first request for power, by a controller, providing power from the power source through a central transfer switch disposed at the mobile power supply unit to a first portable transfer switch electrically connected to a first power receptacle of a first building. The method may further include, at the user interface, receiving a second request for power. The method may further include, responsive to receiving the second request for power and while providing power to the first portable transfer switch, by the controller, providing power from the power source through the central transfer switch to a second portable transfer switch electrically connected to a second power receptacle of a second building physically detached from the first building.

The method may further include receiving power at the central transfer switch from a third portable transfer switch electrically connected to a third power receptacle of a third building physically detached from the first building and the second building.

The method may further include, by the controller, providing power received from the third portable transfer switch through the central transfer switch to at least one of the first portable transfer switch and the second portable transfer switch.

In at least one approach, a non-transitory computer-readable medium has computer-readable instructions stored thereon that are configured to be executed by a processor. The processor may be adapted to receive a request for power provided at a user interface. Responsive to receiving the request for power and a key receptacle at a first transfer switch being in an actuated position, the processor may be adapted to transmit a signal to provide power from a power source through the first transfer switch to a second transfer switch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
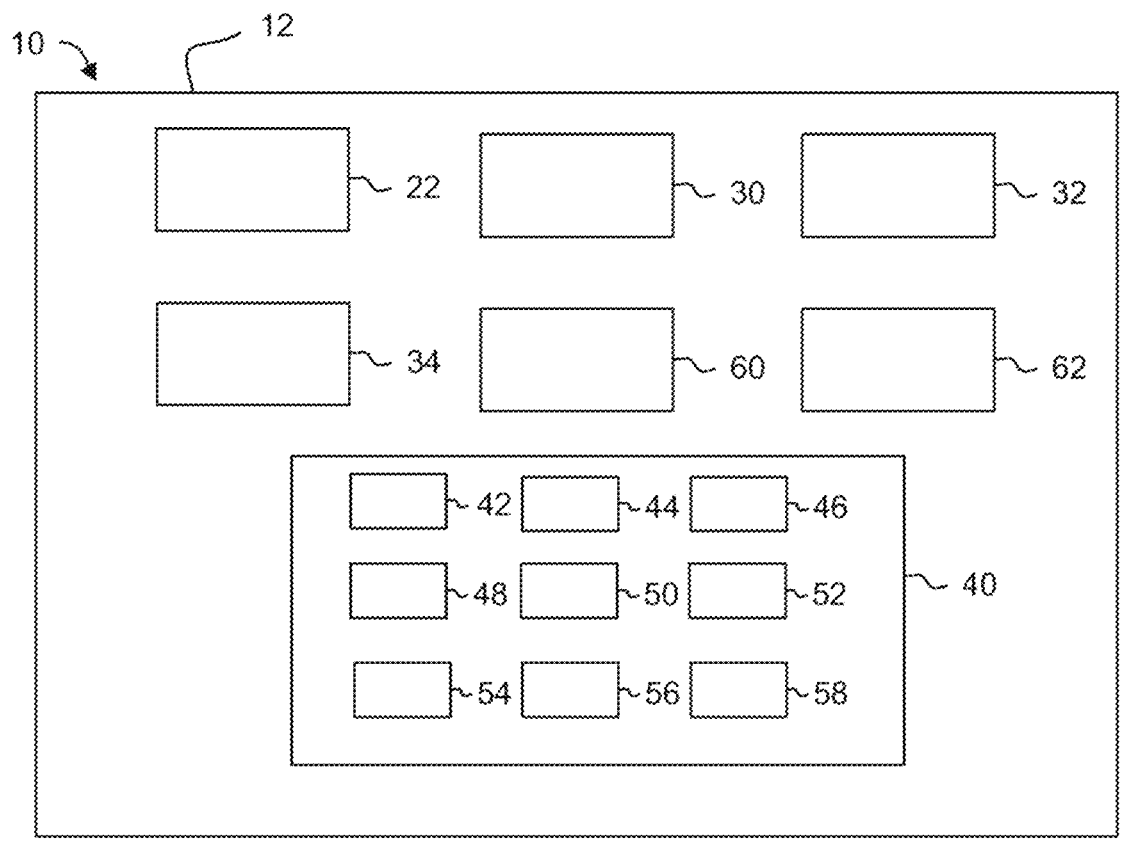
FIG. 1 is a schematic diagram of a mobile power supply unit.
Figure 2:
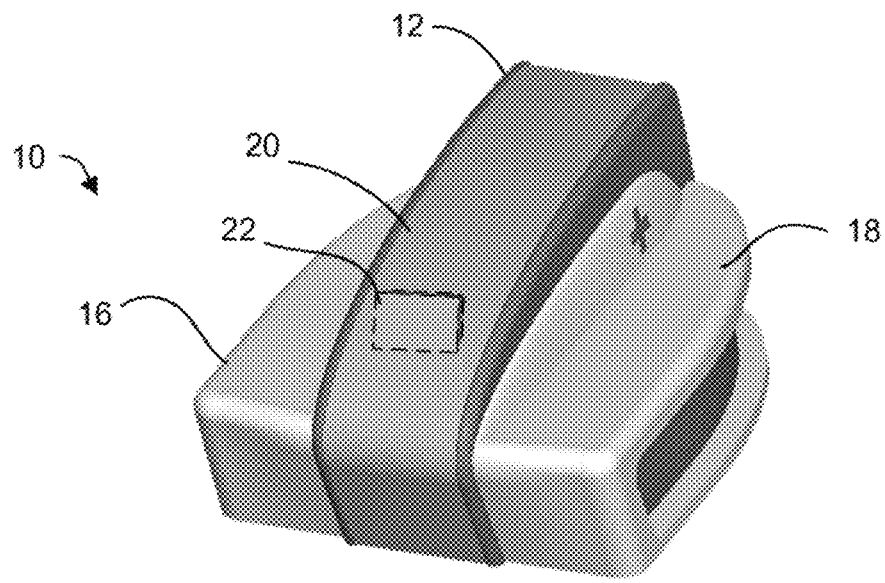
FIG. 2 is a perspective view of a mobile power supply unit in a first configuration.
Figure 3:
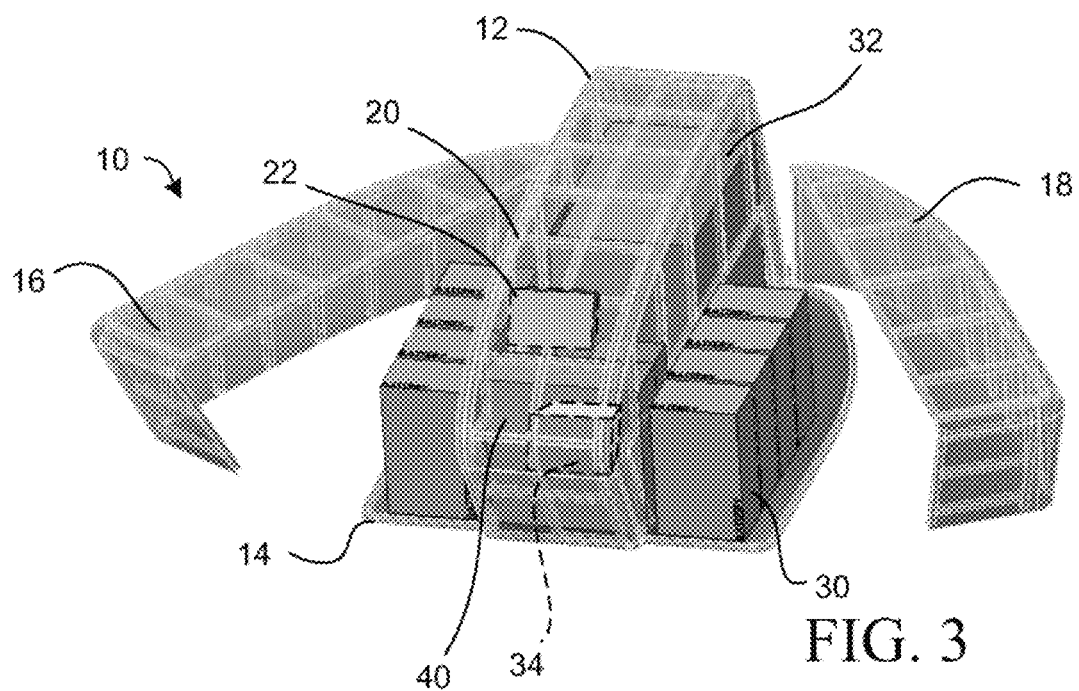
FIG. 3 is a perspective view of a mobile power supply unit in a second configuration.

Referring now to FIGS. 1-3, a mobile power supply unit 10 is provided. The mobile power supply unit 10 is shown schematically in FIG. 1. In FIG. 2, the mobile power supply unit 10 is shown in a first configuration, which may be referred to as a closed configuration. In FIG. 3, the mobile power supply unit 10 is shown in a second configuration, which may be referred to as a partially open configuration.

The mobile power supply unit 10 may include a shell or housing 12. The housing may include a base 14 (shown in FIG. 3), a first side 16 (which may be referred to as a first side arm), a second side 18 (which may be referred to as a second side arm), and a top 20 (which may be referred to as a cover).

The first side 16 and the second side 18 may be movable relative to the base 14 and the top 20. For example, the first side 16 and the second side 18 may be rotatable. Rotational movement of the first side 16 and the second side 18 may be in a plane parallel to an upper surface of the base 14.

In at least one approach, the first side 16 and the second side 18 may be hingedly secured to the base 14 (e.g., about one or more hinges) to permit rotatable movement toward and away from the base 14. In at least another approach, the first side 16 and the second side 18 may be hingedly secured to the top 20 (e.g., about one or more hinges) to permit rotatable movement toward and away from the top 20.

The first side 16 and the second side 18 may define internal cavities sized to house internal components of the mobile power supply unit 10 such as batteries, as discussed in greater detail elsewhere herein. The first side 16 and the second side 18 may be rotated from a closed configuration (in which the internal components may be inaccessible) to an open or partially open configuration (in which the internal components may be accessible). In this way, a user may access one or more internal components such as batteries, for example, to perform maintenance on, or replace, the internal component.

The top 20 may be movable relative to the base 14 and the first and second sides 16, 18. For example, the top 20 may be rotatable. In at least one approach, the top 20 may be hingedly secured to the base 14 about one or more hinges) to permit rotatable movement toward and away from the base 14. The top 20 may define an internal cavity sized to house internal components of the mobile power supply unit 10, as discussed in greater detail elsewhere herein.

Although three housing components are described as movable relative to the base, any suitable number of housing components may be provided. For example, a single housing component may be secured to the base such that the single housing component is rotatable relative to the base. In still another example, two housing components may be secured to the base such that the two housing components are rotatable relative to the base. The one or more housing components may be rotatable in a plane parallel to the base, may be rotatable in a plane perpendicular to the base, may be rotatable in a plane disposed at an oblique angle relative to the base, or any suitable combination thereof.

In still another approach, the one or more housing components may be removable housing components. In this approach, the one or more housing components may be disposed on the base 14 but not rotatably secured to the base 14. For example, the one or more housing components may rest on the base 14 and may be lifted or otherwise removed from the base 14. In this example, a securing arrangement such as a latch may be provided to maintain the one or more housing components in engagement with the base 14.

One or more components of the housing 12 may be formed of polycarbonate or other engineered thermoplastics such as polyethylene, polypropylene, etc. that are crush-resistant and impact resistant. Alternatively, at least one component may be made from a thermoset, a composite material, or both. The housing 12 may include a watertight seal, which may be an overmolded gasket, o-ring, liner or other seal that inhibits or prevents water from entering the housing 12 when the housing 12 is in the closed configuration. The seal may be disposed, for example, on the base 14, the top 20, the first side 16, the second side 18, or any suitable combination thereof. In at least one approach, when the housing 12 is in the closed configuration, the mobile power supply unit 10 may substantially protect internal components to a suitable international Protection Rating (also known as an Ingress Protection Rating) according to the International Electrotechnical Commission standard JEC 60529 to ensure the proper protection from the ingress of external solids and liquids. For example, the mobile power supply unit 10 may substantially protect internal components to an IP rating of 54 ("IP54"), 66 ("IP66"), or other suitable IP rating.

The base 14 may be, for example, a metal base such as an aluminum base. Any other suitable metal or material such as ceramic, plastic, composite, or a combination thereof may be used. The housing 12 may be secured to the base 14 in any suitable manner, such as through one or more fasteners. The base 14 may be adapted to support one or more internal components of the mobile power supply unit 10. The one or more internal components may include at least one battery 30, a generator 32, an inverter 34 (shown in broken line in FIG. 3), and an electronics enclosure 40. One or more of the internal components may be supported by the base 14, and may be directly or indirectly disposed on the base 14.

The components of the housing 12 may be sized to receive the various components of the mobile power supply unit 10. For example, the top 20 of the housing 12 may have an interior having a height suitable for enclosing the generator 32, which may have a maximum height, for example, of approximately 30.5 inches. The first side 16 and the second side 18 may have interiors having heights suitable for enclosing batteries 30. In at least one approach, the interiors of the first side 16 and the second side 18 may be sufficient to enclose the batteries 30 when the batteries are disposed in various orientations. For example, the interiors of the first side 16 and the second side 18 may have a height sufficient to enclose the batteries 30 when the batteries 30 are disposed in a first orientation wherein the batteries 30 have a maximum height of approximately 21.5 inches, when the batteries 30 are disposed in a second orientation wherein the batteries 30 have a maximum height of approximately 13.5 inches, or when the batteries 30 are disposed in a third orientation wherein the batteries 30 have a maximum height of approximately 9 inches. All dimensions provided herein are for illustrative purposes and serve as non-limiting examples.

The mobile power supply unit 10 may be sized such that it may be transported between various locations. For example, the top 20 of the housing 12 may define a maximum height of the housing 12, which may be, for example, approximately 32 inches. The top 20 may also define a maximum depth of the housing 12, which may be, for example, approximately 72 inches. The first side 16, the second side 18, and the top 20 may define a maximum width of the housing 12, which may be, for example, approximately 48 inches. In this way, the mobile power supply unit 10 may be portable such that it may be transported from location to location.

The mobile power supply unit 10 may include a user interface 22. The user interface 22 may be disposed on the housing 12, for example, at the top 20. The user interface 22 may be, for example, a screen for displaying information. The user interface 22 may further be a touchscreen for receiving user input. For example, a user may select between various options displayed on the screen. Furthermore, the user interface 22 may be adapted to display a keypad or keyboard. In this way, a user may be prompted to provide, and the user interface 22 may receive, information such as an authentication input. An authentication input may include one or more of passwords, passcodes, and biometric authentications such as fingerprints that may be received at a fingerprint reader.

The screen may be in the range, for example, of approximately 7 inches to approximately 19 inches (as measured by the distance between opposite corners; e.g., the length of its diagonal), and more particularly, in the range of approximately 15 inches to approximately 19 inches. The screen may be a widescreen that may present a wide field of vision in relation to its height. For example, the screen may have a 16:9 aspect ratio. Alternatively, the screen may have any suitable aspect ratio, such as 1:1, 5:4, 4:3, 3:2, or 3:1. A widescreen display may permit wide view angles as compared to other formats.

In at least one approach, the user interface 22 may be a flat display screen. In still another approach, the user interface 22 may be a curved display screen. The curved display screen may, for example, have a curvature corresponding to a curvature of the housing 12 at surfaces adjacent to the user interface 22.

The user interface 22 may be a dimmable screen. In this way, energy consumption at the user interface 22 may be reduced. As such, the service time of the mobile power supply unit 10 may be increased.

The user interface 22 may also or instead include one or more inputs such as buttons or switches for receiving user input.

In at least one approach, the user interface 22 may be used to operate one or more housing components, including the first side 16, the second side 18, and the top 20. In at least one example, the user interface 22 may receive a request to open at least one of the housing components. In one approach, the user interface 22 may automatically open the requested housing component or components, or may unlock a lock to permit manual manipulation of a housing component. In another approach, the user interface 22 may prompt the requester for a password, passcode, and/or other authentication input. In response to receiving a suitable authentication input, the user interface may automatically open a requested housing component, or may unlock a lock to permit manual manipulation of the housing component.

The user interface 22 may further include an optical interface. The optical interface may include one or more cameras. The optical interface may be used, for example, to capture visual images of the surroundings of the mobile power supply unit 10. The optical interface may further be adapted to receive authentication inputs, such inputs as for iris recognition techniques.

The user interface 22 may further include an auditory interface. The auditory interface may include one or more microphones and/or speakers. The auditory interface may be used, for example, to capture audible sounds of the surroundings of the mobile power supply unit 10. The auditory interface may further be adapted to receive audible commands or audible authentication inputs, such as passwords or passcodes.

In at least one approach, the user interface 22 is secured to mobile power supply unit 10 and may, for example, be hardwired to one or more components of the mobile power supply unit 10 such as a controller. In still another approach, the user interface 22 may be a portable user interface. The portable user interface may be, for example, a remote personal device (e.g., a cell phone such as a smartphone, a tablet computer, a laptop computer, etc.). In this way, the portable user interface may wirelessly communicate with one or more components of the mobile power supply unit 10 such as a controller.

In at least one approach, the mobile power supply unit 10 includes a plurality of batteries 30. For example, as shown in FIG. 3, the mobile power supply unit 10 may include six batteries 30. Any suitable number of batteries may be provided. The batteries 30 may be, for example, lithium ion batteries, lithium phosphate batteries, lithium sulfur batteries, or any suitable combination thereof. Individual batteries 30 may have specifications, for example, including: a voltage in the range of approximately 24.0V to approximately 28.8V, a capacity of approximately 100 Ahr, an operating temperature in the range of approximately −20° C. to approximately 65° C., a cycle life of at least 3,000 cycles. Individual batteries 30 may have indicators such as status LEDs for indicating a status of the battery 30. Other suitable batteries and battery specifications are expressly contemplated herein.

A plurality of individual batteries 30 may be electrically coupled in series to provide increased voltages. For example, six 24V batteries 30 may be electrically coupled in series to produce a total voltage of 144V to be supplied to the inverter 34. In at least one approach, the batteries 30 may be electrically coupled in both parallel and series. As used herein, the terms "electrically coupled" and "electrically connected" may be used interchangeably, and may refer to a connection that provides for the flow of electrons (electric current) between two or more electrically coupled or connected discrete points. The two or more points may be electrically coupled or connected, for example, by a conducting path or through a capacitor.

The generator 32 may be, for example, a 15,000-Watt generator capable of providing 22,500-Watt peak power. The generator 32 may be a gasoline powered generator. In this way, the generator 32 may be provided with a fuel tank of any suitable size (e.g., a 10- to 30-gallon fuel tank, and more particularly, a 16-gallon fuel tank). Other sources of power such as diesel, propane (in liquefied or gaseous form), natural gas, or any combination thereof may be used. In still another approach, the generator 32 may be coupled to an engine (such as an internal combustion engine) of a vehicle to receive fuel from the vehicle. The generator 32 may include an engine, such as an overhead value (OHV) engine. Other suitable generators and generator specifications are expressly contemplated herein.

The batteries 30 may be connected (e.g., electrically coupled) to the generator 32, for example, through the inverter 34. In this way, the generator 32 may be adapted to charge the batteries 30.

The inverter 34 may be connected (e.g., electrically coupled) to the batteries 30 and the generator 32. The inverter 34 may be adapted to provide a continuous output power in the range of approximately 5,000 Watts to approximately 12,000 Watts or more. The inverter 34 may be adapted to, for example, convert DC power from the batteries 30 into AC power (e.g., 120-volt, 60-Hz AC power). In still another approach, the inverter 34 may be connected (e.g., electrically coupled) to a battery or electrical system of a vehicle to receive electricity from the vehicle.

In addition to batteries 30 and a generator 32, the mobile power supply unit 10 may include, or may be electrically coupled to, one or more additional sources of power. The additional sources of power may be disposed within the housing 12 or outside of the housing 12. The additional sources of power may include alternative energies, such as solar thermal systems or solar photovoltaic (PV) systems for extracting solar energy, geothermal energy systems, hydroelectric energy systems, biomass energy systems, one or more wind turbines, etc. Power received from the one or more additional sources of power may be used to charge the batteries 30, and may be transferred to the inverter 34.

Figure 4:
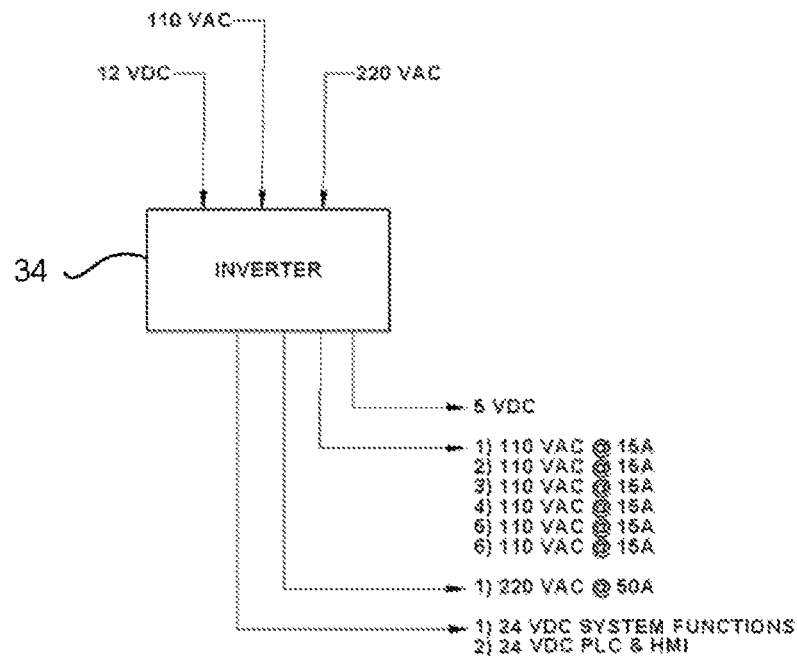
FIG. 4 is a schematic diagram of an inverter.

Referring to FIG. 4, the inverter 34 may include one or more (e.g., four) 5vDC outputs, one or more (e.g., two) 12vDC outputs, one or more (e.g., one) 24vDC outputs, one or more (e.g., six) 110vAC outputs, and one or more (e.g., one) 220vAC output.

The inverter 34 may also function as a charger and thus may be referred to as an inverter-charger. The inverter-charger may, tier example, be adapted to charge the batteries 30. In this way, the inverter 34 may include one or more 12vDC, 110vAC, and 220vAC inputs. The inputs may receive power from another source, such as the generator 32 or an electrical grid of a structure.

Figure 5:
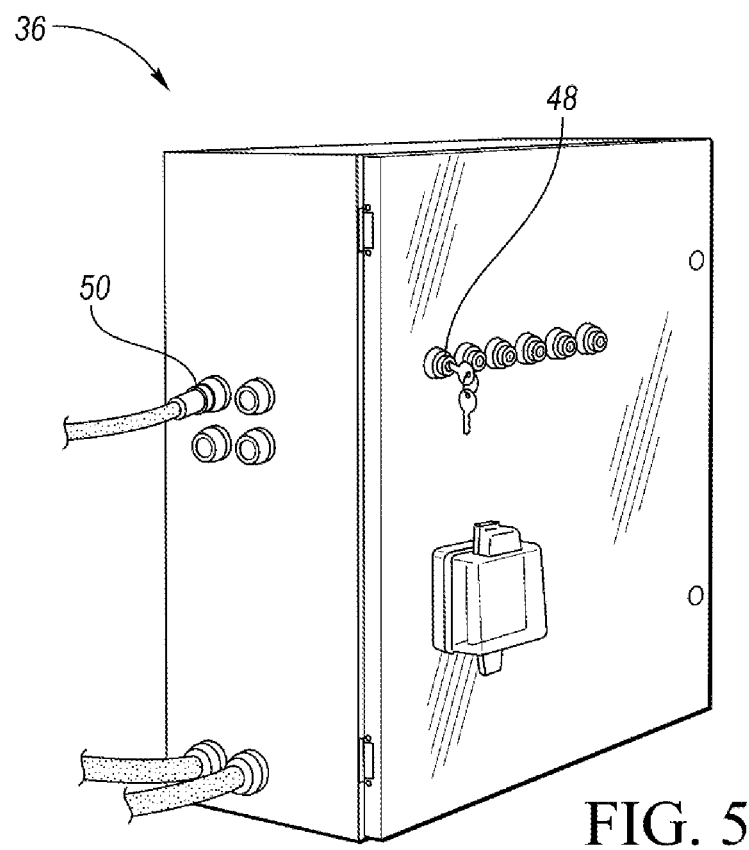
FIG. 5 is a perspective view of an electronics enclosure.

An electronics enclosure 40 is shown in FIG. 5. The electronics enclosure 40 may house various components. For example, the electronics enclosure 40 may house one or more communication components 42. The communication components 42 may be wireless communication components such as one or more antennas, receivers, transmitters, transceivers, or any suitable combination thereof. Wireless transmissions may be in the form of any wireless communication technology, including satellite communications, cellular communications (such as cellular data networks, text, and short message services that may be sent over various telecommunication standards including 4G LT), radio waves and other radio communications, wireless local area networks (such as Wi-Fi or WiMax networks), personal area networks (such as a Bluetooth, IrDA, Z-Wave or ZigBee), and other internet communications. The communication components may also be wired communication components. The wired communication components may include receivers or ports adapted to interface and communicate via a wired connection such as through electrical transmission cables, coaxial cables, Ethernet cables, fiber optic communication cables, or other communication cables. In this way, the electronics enclosure 40 may include one or more interfaces or ports (e.g., USB and ethernet ports) for coupling with a wired communication component. Additional forms of known wired and wireless communication may also be utilized.

In this way, the mobile power supply unit 10 may be adapted to communicate with external sources. For example, the communication components 42 may receive communications such as remote diagnostic communications or troubleshooting communications. The communication components 42 may also provide a communications network that may be utilized by other devices. For example, the communication components 42 may provide a satellite network or mobile hotspot (e.g., Bluetooth, Wi-Fi, or cellular). In this way, computing devices such as mobile phones may be provided with a communications network.

The electronics enclosure 40 may also include one or more controllers 44. The controllers 44 may be or may include processor that may be any suitable processing device or set of processing devices such as, hut not limited to, a microprocessor, a microcontroller-based platform, an integrated circuit, one or more field programmable gate arrays (FPGAs), and/or one or more application-specific integrated circuits (ASICs). The controllers 44 may be adapted to control one or more functions of the mobile power supply unit 10. For example, a system controller may be adapted to control operating modes and/or power distribution at the mobile power supply unit 10. The system controller may be in communication with one or more controllers, such as a communications controller.

The electronics enclosure 40 may include a fan assembly 46 that may have a fan and a motor for operating the fan. Operation of the fan may cool one or more components within the electronics enclosure 40. In this way, the mobile power supply unit 10 may be adapted to operate at elevated temperatures (e.g., in environments having temperatures of over 60 degrees C.).

As shown in FIG. 5, the electronics enclosure 40 may include one or more key receptacles 48. The key receptacles 48 may receive and may be actuated by corresponding keys. The keys may actuate the key receptacle by rotating, a lock cylinder of the key receptacle from a first position to a second position. Actuation of the key receptacles 48 may indicate an authorized request for power, and deactuation of the key receptacles 48 may terminate the request for power. In this way, the electronics enclosure 40 may be, or may include, a control box for controlling distribution of power.

The electronics enclosure 40 may also include one or more electrical ports 50. As shown in FIG. 5, the electronics enclosure 40 may include four electrical ports 50. As shown in FIG. 4, the electronics enclosure 40 may include 6 electrical ports e.g., corresponding to the six 110 VAC outputs). In still other approaches, the electronics enclosure 40 may include one, two, six, twelve, twenty-four, or more electrical ports 50. The electrical ports 50 may be adapted to provide power, receive power, provide communications, receive communications, or any combination thereof. The electrical ports 50 may be, for example, 4-pin ports, and may have male or female configurations. The electrical ports 50 may be adapted to receive a transfer cable, as described elsewhere herein.

In at least one approach, the electrical ports 50 may be accessible through one or more of the movable housing components such as the top 20, the first side 16, and/or the second side. In still another approach, the electrical ports 50 may be accessible through the base 14. In this way, and referring momentarily to FIG. 8, the electrical ports 50 may be accessible through an underside of a vehicle 120.

An individual key receptacle 48 the electronics enclosure 40 may correspond to an individual electrical port 50. In one example, an electronics enclosure 40 having, four electrical ports 50 may have four key receptacles 48. Each of the four individual key receptacles 48 may correspond to one of the six electrical ports 50. In another example, an electronics enclosure 40 having six electrical ports 50 may have six key receptacles 48. Each of the six individual key receptacles 48 may correspond to one of the six electrical ports 50.

Referring again to FIG. 1, electronics enclosure 40 may also include one or more transfer switches 52. A transfer switch 52 may be electrically coupled to the inverter 34. In this way, the transfer switch 52 may be adapted to transfer power from the inverter 34 to one or more electrical ports 50. The transfer switch 52 may also be adapted to transfer power to the inverter 34 from one or more electrical ports 50. As transfer switch 52 may be disposed within the mobile power supply unit 10, the transfer switch 52 may be referred to as a central transfer switch.

The electronics enclosure 40 may also include one or more memory devices 54. The memory devices 54 may be in communication with one or more other components such as a controller 44. The memory 54 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g. EPROMs), read-only memory, and/or high-capacity storage devices (e.g., hard drives, solid state drives, etc.). In some examples, the memory 54 may include multiple kinds of memory, particularly volatile memory and non-volatile memory.

The memory 54 may be a computer readable media on which one or more sets of instructions such as the software for operating the methods of the present disclosure, can be embedded. The instructions may embody one or more of the methods or logic as described herein. For example, the instructions may reside completely, or at least partially, within any one or more of the memory 54, the computer readable medium, and/or within the controller 44 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The electronics enclosure 40 may also include one or more metering devices 56. The metering devices 56 may monitor and track electricity distribution to one or more portable transfer switches, as discussed in greater detail elsewhere herein. The metering devices 56 may further monitor and track electricity distribution from one or more portable transfer switches. The electricity distribution may be displayed, for example, at the user interface 22.

The electronics enclosure 40 may also include one or more system time devices 58. A system time device 58 may be represent the mobile power supply unit's 10 notion of the passing of time. In this way, the system time device 58 may track a slate, time, and/or a time interval (for example, a time interval measuring the duration of operation).

The mobile power supply unit 10 may further include a first aid kit 60 disposed within the housing 12. The first aid kit 60 may contain one or more of plasters, sterile gauze dressings, sterile eye dressings, triangular bandages, crêpe rolled bandages, safety pins, sterile gloves, tweezers, scissors, alcohol-free cleansing wipes, sticky tape, thermometer, skin rash cream (such as hydrocortisone or calendula), cream or spray to relieve insect bites and stings, antiseptic cream, painkillers such as paracetamol, aspirin, or ibuprofen, cough medicine, antihistamine tablets, distilled water, eye wash, an eye bath, or any combination thereof.

The mobile power supply unit 10 may further include a water filtration system 62 disposed within the housing 12. At the water filtration system 62, water may be introduced at an inlet and may be passed through one or more filters, which may be microfiltration filters. The filters may be, for example, hollow fibers that may trap pathogens as the water passes through or over the fibers. The filters may also, or instead, be ion-exchange filters that may contain zeolites that may contain sodium. The filters may also provide activated carbon filtration.

Figure 6:
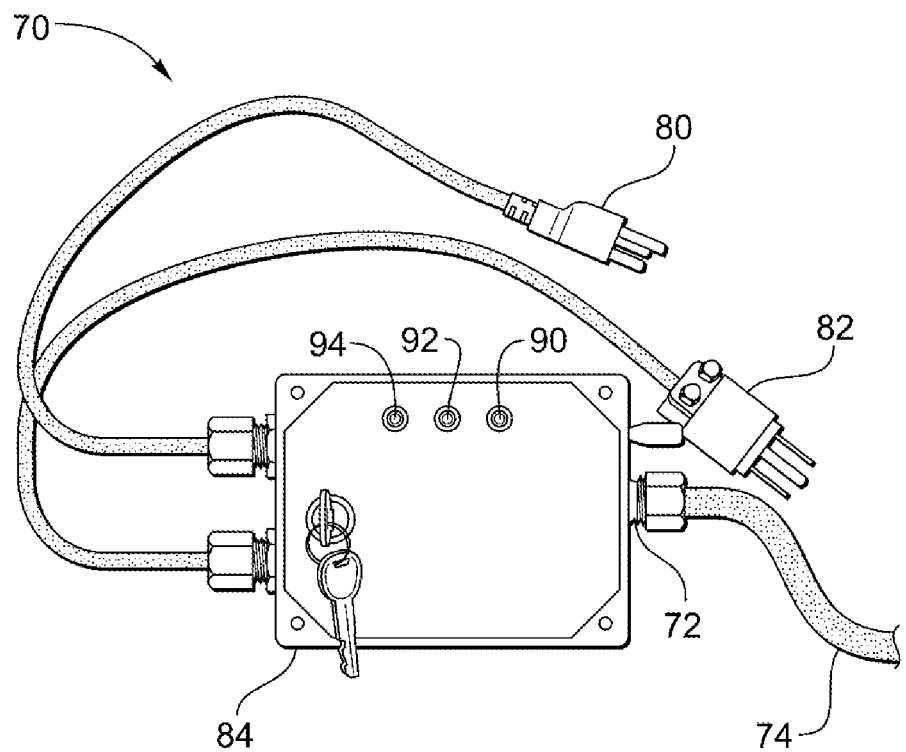
FIG. 6 is a top plan view of a portable transfer switch.

Referring now to FIG. 6, one or more portable transfer switches 70 may be provided. As used herein, the term "portable" refers to a transfer switch that may be a handheld transfer switch. The portable transfer switches 70 may be carried by a user from location to location. The portable transfer switches 70 may be disposed outside of the housing 12 of the mobile power supply unit 10.

The portable transfer switches 70 may include an electrical port 72. The electrical port 72 may be similar to the electrical port 50 of the electronics enclosure 40. The electrical port 72 may be adapted to receive a transfer cable 74. In this way, a transfer cable 74 may be connected at a first end to an electrical port 50 of the electronics enclosure 40, and at a second end to the electrical port 72 of the portable transfer switch 70. As such, the mobile power supply unit 10 may be electrically coupled to a quantity of portable transfer switches 70 that corresponds to the quantity of electrical ports 50 at the electronics enclosure 40. For example, a mobile power supply unit 10 that includes six electrical ports 50 may be connected to six portable transfer switches 70.

In at least one approach, one or more transfer cables 74 may be disposed in a retractable configuration at the mobile power supply unit 10. In at least one approach, a transfer cable 74 may be connected to an electrical port 50 of the electronics enclosure 40, and may be selectively retracted, and drawn, from a spool. The spool may be disposed within or adjacent to the mobile power supply unit 10. For example, a spool may be disposed below the mobile power supply unit 10; for example, below the base 14, or within or below an undercarriage of a vehicle supporting the mobile power supply unit 10. In at least one approach, multiple spools may be provided. For example, a spool may be provided for each transfer cable 74. In this way, a user may selectively draw a transfer cable 74 electrically connected to the mobile power supply unit 10 (e.g., when power from the transfer cable 74 is desired), and may retract the transfer cable 74, or cause the transfer cable 74 to be retracted (e.g., when the transfer cable 74 is not needed).

A portable transfer switch 70 may further include one or more power cables. For example, as shown in FIG. 6, a portable transfer switch may be provided with a first power cable 80 and a second power cable 82. The first power cable 80 and the second power cable 82 may be adapted to connect to 120 AC wall sockets.

The portable transfer switch 70 may be provided with one or more key receptacles 84. A key receptacle 84 may receive and may be actuated by a corresponding key. Actuation of the key receptacle 84 may indicate an authorized request for power, and deactuation of the key receptacle 84 may terminate the request for power.

The portable transfer switch 70 may include one or more annunciation interfaces. In at least one approach, the annunciation interface may be, or may include, a visual indicator for providing a visual annunciation. In still another approach, the annunciation interface may be, or may include, a speaker for providing an audible annunciation.

In one example approach, the portable transfer switch 70 may include a first LED indicator 90, a second LED indicator 92, and a third LED indicator 94. The first LED indicator 90 may be a green LED indicator, and may indicate, when illuminated, that power is being received at the portable transfer switch 70 from the mobile power supply unit 10. The second LED indicator 92 may be a yellow LED indicator, and may indicate, when illuminated, that no power is being transferred from either a mobile power supply unit 10 or the electrical box (e.g., as monitored through the second power cable 82). The third LED indicator 94 may be a green LED indicator, and may indicate, when illuminated, that power is being supplied from the electrical box to the portable transfer switch 70 (e.g., through the second power cable 82). The individual colors of the indicators may differ.

A controller 44 of the mobile power supply unit 10 may be adapted to monitor and control the distribution of power from the transfer switch 52 to one or more portable transfer switches 70, as well as from one or more portable transfer switch 70 to the transfer switch 56, as discussed in greater detail elsewhere herein. The controller may monitor and control the distribution of power to and for from the one or more portable transfer switches individually or collectively.

Figure 7:
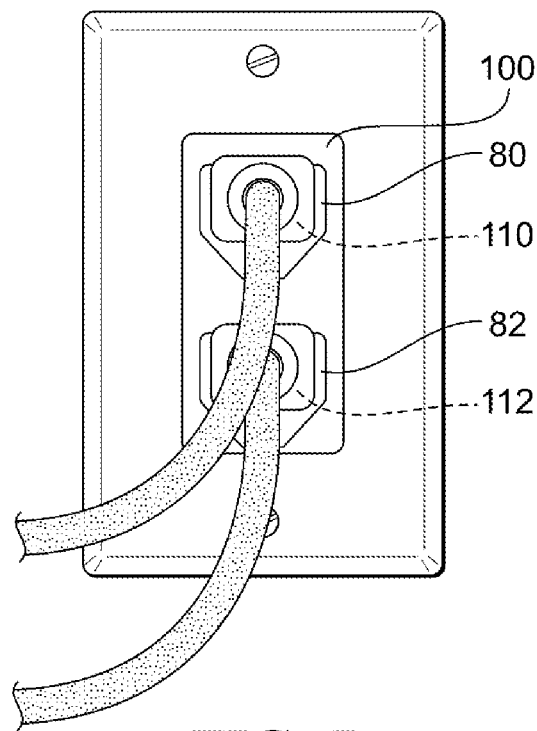
FIG. 7 is a front elevation view of an electrical box.
Figure 9:
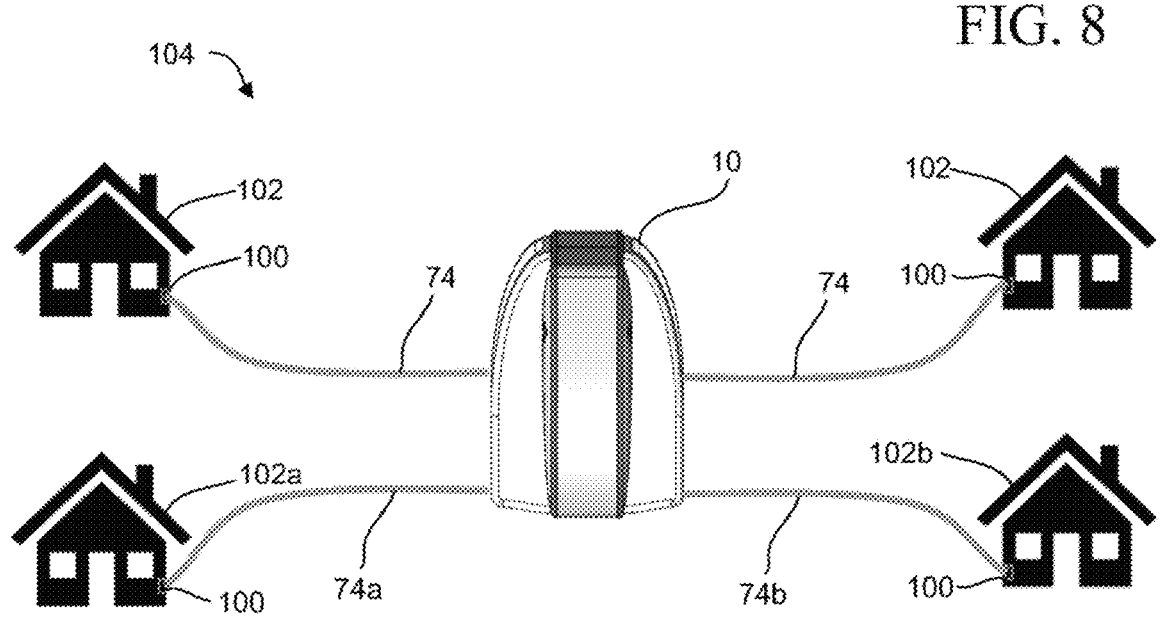
FIG. 9 is a schematic representation of a mobile power supply unit electrically connected to multiple buildings.

Referring now to FIG. 7, the portable transfer switch 70 may be electrically connected to an electrical box 100. The electrical box 100 may be associated with a building 102 (as shown in FIG. 9). For example, the electrical box 100 may be a wall socket, such as a 120V AC wall socket, of a residential or commercial building.

In one example approach, the first power cable 80 may be connected to a first receptacle 110 at an electrical box 100, and the second power cable 82 may be connected to a second receptacle 112 at the electrical box 100. The portable transfer switch 70 may be adapted to transmit electricity through the first power cable 80 to the first receptacle 110, and may thereby provide power to a power distribution system of a building 102 associated with the electrical box 100. The portable transfer switch 70 may be adapted to monitor power at the electrical box 100 through the second power cable 82. For example, the portable transfer switch 70 may be adapted to monitor, through the second power cable 82, for mains power at the electrical box 100.

Figure 8:
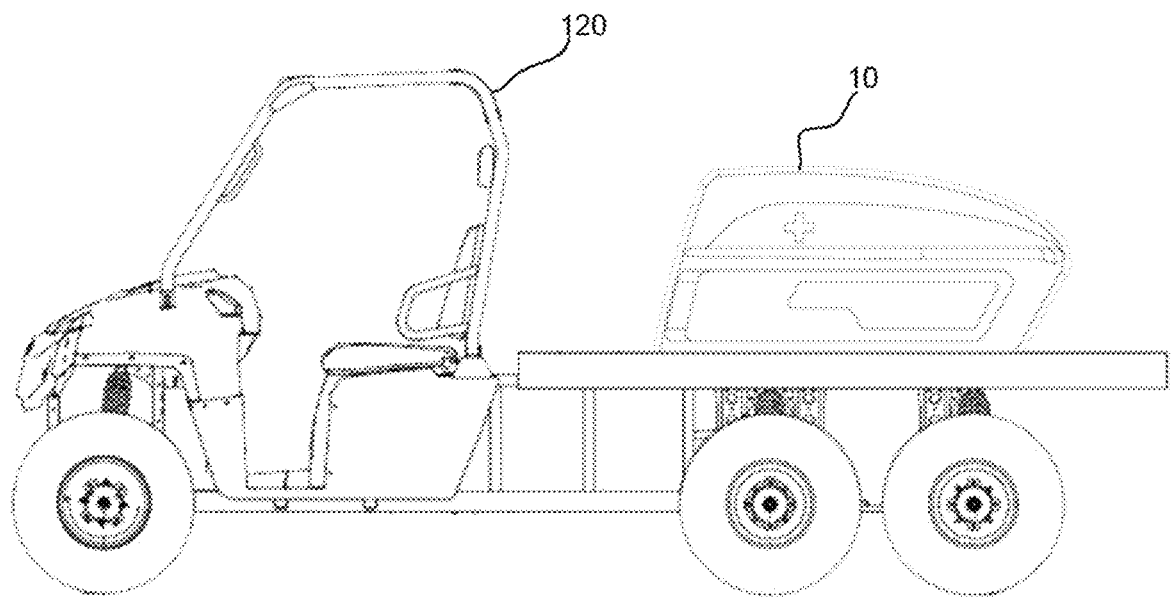
FIG. 8 is a side elevation view of a mobile power supply unit and a vehicle.

Referring now to FIG. 8, in at least one approach, the mobile power supply unit 10 may be disposed on a vehicle 120. The mobile power supply unit 10 may be disposed, for example, in a bed or other platform of the vehicle 120. The mobile power supply unit 10 may be rigidly secured to the vehicle 120; for example, through one or more fasteners, welds, or other suitable approaches for fixing the mobile power supply unit 10 to the vehicle 120. In still another approach, the mobile power supply unit 10 may be disposed on or in the vehicle 120 such that the mobile power supply unit 10 may be removed (or may be removable) from the vehicle 120.

The vehicle 120 may be an off-road vehicle (ORV) such as an all-terrain vehicle (ATV) or utility vehicle (UTV). In this way, the mobile power supply unit 10 may be able to be delivered to a location that may otherwise be difficult to reach using vehicles that typically travel public streets or highways. In still another approach, the mobile power supply unit 10 may be disposed in a truck, such as a pickup truck or in a semi-trailer truck. In still another approach, the mobile power supply unit 10 may be disposed in or on a trailer to be pulled by a vehicle.

In still other approaches, the mobile power supply unit 10 may be provided with wheels. The wheels may be connected to the housing 12, the base 14, or at any other suitable location. In this way, the mobile power supply unit 10 may be transported to locations not accessible with a vehicle. The wheels may be removable wheels.

Referring to FIG. 9, the mobile power supply unit 10 may be associated with one or more buildings 102 at a given location 104. The buildings 102 may be separate buildings 102 that, while possibly electrically connected to a central power source, may have independent electrical wiring. The buildings 102 may be geographically spaced from one another such that they are physically detached (e.g., having spaced apart exterior walls). In one example, the buildings 102 may be disposed on opposite sides of a street. Individual power cables 80, 82 of the portable transfer switches 70 may be plugged into electrical boxes 100 at the buildings 102.

In one example approach, one or more of the buildings 102 may not have power. For example, power as otherwise supplied by a utility provider may not be available for distribution through the power distribution system of a building 102. In this example, the mobile power supply unit 10 may be adapted to be electrically coupled to the building 102 to supply power (e.g., as supplied from the batteries 30 or generator 32) to the building 102. More particularly, mobile power supply unit 10 may be electrically coupled to an electrical box 100 of the building 102 through the portable transfer switch 70 to provide power to the power distribution system of the building 102.

In another example approach, one or more of the buildings 102a may not have power, and one or more of the buildings 102b may have power distributed through the power distribution system of the building 102b. In this example, the mobile power supply unit 10 may be adapted to be electrically coupled to the powered building 102b to receive power from the building 102b at the mobile power supply unit 10 (e.g., through a transfer cable 74 associated with a portable transfer switch 70 electrically connected to the building 102b). The power received at the mobile power supply unit 10 from the building 102b may be supplied to the building 102a without power (e.g., through a transfer cable 74a associated with a portable transfer switch 70 electrically connected to the building 102a). In this way, the mobile power supply unit 10 may be adapted to draw electricity from a first building 102b, and may direct the electricity to a second building 102a.

The mobile power supply unit 10 may also be adapted to draw electricity from a powered building 102b to charge the batteries 30 of the mobile power supply unit 10.

In at least one approach, the metering device 56 may be adapted to monitor power received from a powered building 102b. Mobile power supply unit 10 may further be adapted to display an indication of power received from the powered building 102b, for example, at the user interface 22. In this way, an owner of the powered building 102b may be informed of power drawn from the building 102b, and may use this information for purposes of reimbursement (e.g., financial reimbursement).

The mobile power supply unit 10 may operate in one or more operating modes when providing power to a portable transfer switch 70. For example, the mobile power supply unit 10 may operate in a manual operation mode. In the manual operation mode, the mobile power supply unit 10 may supply power until a power source is exhausted. For example, when a battery 30 is the power source, the mobile power supply unit 10 may provide power from the battery 30 until the charge of the battery 30 is exhausted. In still another example, when a generator 32 is the power source, the mobile power supply unit 10 may provide power from the generator 32 until the generator 32 exhausts the fuel supply (e.g., gasoline). In still another approach, when operating in the manual operation mode, the mobile power supply unit 10 may supply power until a power source is reduced to a predetermined power level (e.g., 1 gallon or 10% state-of-charge) before user-selected period of time elapses. When the power source is reduced to the predetermined power level, the mobile power supply unit 10 may terminate the provision of power.

In one exemplary approach, when operating in the manual mode and when not in quiet mode, one or more batteries 30 may serve as the default power source. When the charge of the batteries is reduced to approximately 10% capacity, a secondary source of power may be utilized (e.g., generator 32).

The mobile power supply unit 10 may also be adapted to operate in a time-based operation mode. In the time-based operation mode, a user may instruct, for example, at the user interface 22, the mobile power supply unit 10 to provide power to a portable transfer switch 70 for a user-selected period of time (e.g., 10 minutes, 30 minutes, 1 hour, 5 hours, 10 hours, 1 day, 2 days, 1 week, etc.). In the time-based operation mode, the mobile power supply unit 10 may supply power until the user-selected period of time elapses. In at least one approach, in the time-based operation mode, the mobile power supply unit 10 may supply power until a power source is exhausted before the user-selected period of time elapses, similar to the operation in the manual mode, as previously discussed. In still another approach, when operating in the time-based operation mode, the mobile power supply unit 10 may supply power until a power source is reduced to a predetermined power level (e.g., 1 gallon or 10% state-of-charge) before the user-selected period of time elapses. When the power source is reduced to the predetermined power level, the mobile power supply unit 10 may terminate the provision of power, even if the user-selected period of time has not elapsed.

The mobile power supply unit 10 may also be adapted to operate in a standard operation mode or a quiet operation mode. The quiet operation mode may further be a manual quiet operation mode or a time-based quiet operation mode. In the manual quiet operation mode, the mobile power supply unit 10 may be adapted to inhibit operation of a relatively loud component such as the generator 32. Also in the manual quiet mode, the mobile power supply unit 10 may draw power from another source such as the batteries 30, that does not emit audible noise when providing power.

In the time-based quiet mode, the mobile power supply unit 10 may be adapted to inhibit operation of the generator 32 during a user-input quiet mode duration. For example, prior to (or after) a user initiates a quiet mode, the mobile power supply unit 10 may receive (e.g., at the user interface 22) a user input corresponding to the quiet mode duration. The quiet mode duration may be in the form of a time-keeping convention (e.g., a 12-hour clock or a 24-hour clock). The quiet mode duration may also or instead be in the form of an elapsed time duration (e.g., 10 minutes, 30 minutes, 1 hour, 5 hours, 10 hours, etc.), or other suitable quiet mode duration. In the time-based quiet mode, the mobile power supply unit 10 may be adapted to inhibit operation of a relatively loud component such as the generator 32 during the user-input quiet mode duration. Also in the time-base quiet mode, the mobile power supply unit 10 may draw power from another source such as the batteries 30, that does not emit audible noise when providing power during the user-input quiet mode duration.

When the mobile power supply unit 10 is operating in the time-based quiet mode when not during the user-input quiet mode duration, the mobile power supply unit 10 may select any suitable power source, including the generator 32. The power source may be selected, for example, based on a state-of-charge of one or more of the batteries 30, the fuel supply of the generator 32, or a power demand from the mobile power supply unit 10 (which may correspond to a power demand over a previous time period, such as the previous 1, 4, or 8 hours).

The mobile power supply unit 10 may also be adapted to operate in an energy-based operation mode. In the energy-based operation mode, a user may instruct, for example, at the user interface 22, the mobile power supply unit 10 to operate until a user-selected energy threshold has been transferred from the mobile power supply unit 10 to one or more portable transfer switches 70. The user-selected energy threshold may be, for example, 1 kilowatt hour (kWh), 30 kWh, 100 kWh, 300 kWhs, or any suitable energy consumption threshold. The power transferred to a portable transfer switch 70 may be monitored, for example, by a metering device 56 of the mobile power supply unit 10, in at least one approach, in the energy-based operation mode, the mobile power supply unit 10 may supply power until a power source is exhausted before the user-selected energy threshold is achieved, similar to the operation in the manual mode, as previously discussed. In still another approach, when operating in the energy-based operation mode, the mobile power supply unit 10 may supply power until a power source is reduced to a predetermined power level (e.g., 1 gallon or 10% state-of-charge) before the user-selected energy threshold is achieved. When the power source is reduced to the predetermined power level, the mobile power supply unit 10 may terminate the provision of power, even if the user-selected energy threshold has not been achieved.

In at least one approach, a selected mode of operation may be applied to the provision of power through all connected tentacle cables. In still another approach, individual modes of operation may be designated for individual tentacle cables. In this way, a first mode of operation (e.g., a manual operation mode) may be selected for a first tentacle cable, and a second mode of operation different than the first mode (e.g., a time-based operation mode) may be selected for a second tentacle cable.

Figure 10:
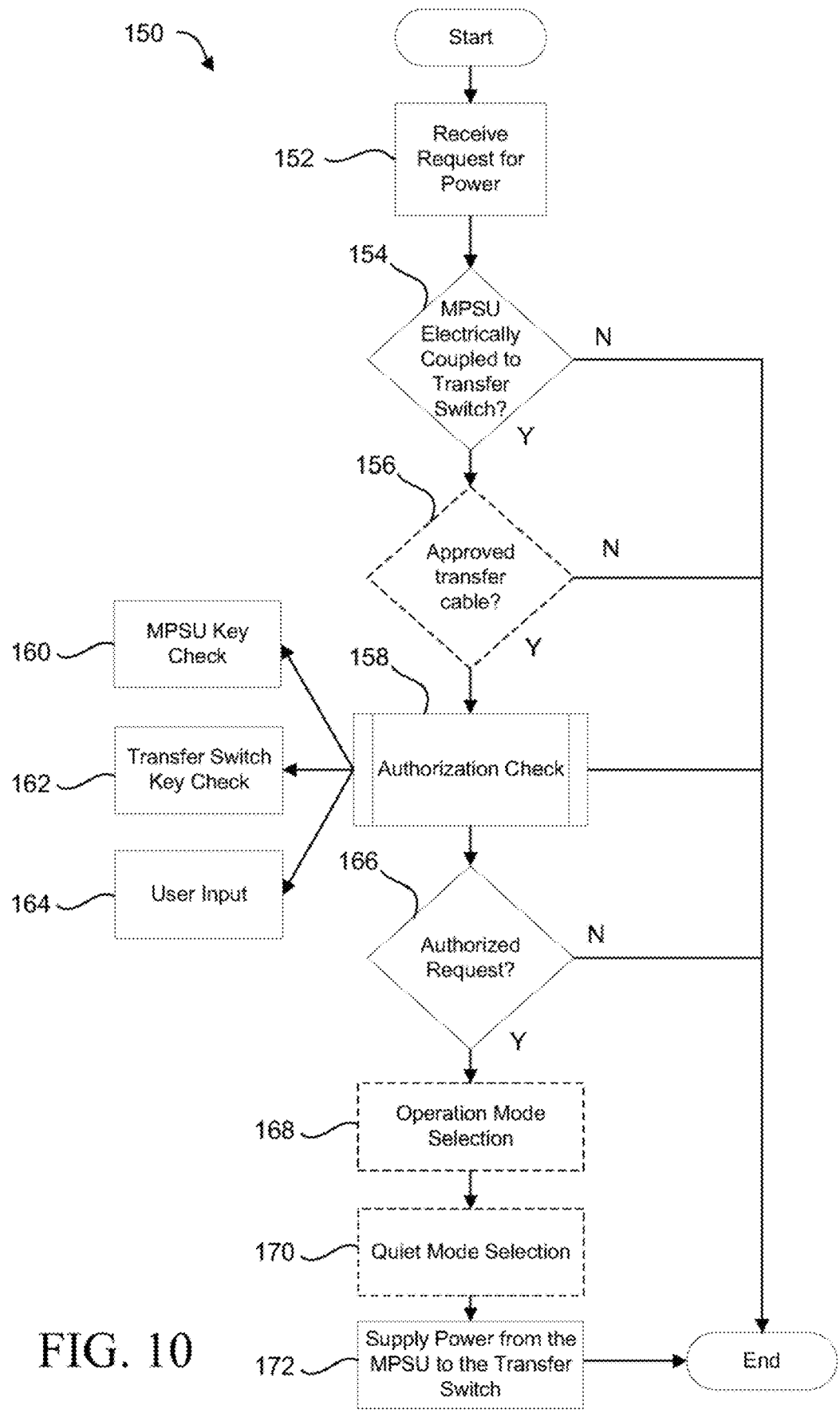
FIG. 10 illustrates a representative process for providing power.

Referring to FIG. 10, in at least one approach, a method 150 for providing power is provided. The method may include receiving 152 a request for power. The request for power may be received at the user interface of a mobile power supply unit (MPSU); for example at user interface of the mobile power supply unit 10. As discussed, the user interface may be a touchscreen. As such, the request for power may be a user input at the touchscreen. In still another approach, the power request may be a remotely transmitted power request. For example, a power request may be a wired or wireless transmission received at the mobile power supply unit. The wired or wireless transmission may be transmitted, for example, from a remote location (e.g., a location geographically distant from the mobile power supply unit by at least ½ kilometer).

In an optional approach, the power request may include additional information. For example, the power request may further specify a desired electrical port through which power is requested. In this way, the power request can be directed to desired portable transfer switch.

The method 150 may further include, by a controller (e.g., controller 44 of the mobile power supply unit 10), determining 154 if a portable transfer switch (e.g., portable transfer switch 70) is electrically connected to the mobile power supply unit. The electric coupling may be, for example, through a transfer cable (e.g., transfer cable 74)

that is plugged in at one end to the mobile power supply unit and at the opposite end to a portable transfer switch. In this way, the method may further include electrically connecting a portable transfer switch to the mobile power supply unit.

If the mobile power supply unit is not electrically connected to a portable transfer switch, the controller may not provide, or may inhibit the provision of, electricity from the mobile power supply unit; for example, through the requested electrical port. In an optional approach, the controller may further effect a fault message (for example, at the user interface) in response to the received request for power. The fault message may indicate that the mobile power supply unit is not electrically coupled to a portable transfer switch.

In an optional approach, if the mobile power supply unit is electrically connected to a portable transfer switch, the method may proceed to step 156 where the controller may determine whether an approved transfer cable electrically couples the mobile power supply unit to a portable transfer switch. The approved transfer cable may be one of a group of predetermined approved transfer cable. The approved transfer cable may also include an authentication protocol. For example, the approved transfer cable may include a wired and/or wireless transmitter or transceiver adapted to communicate an authentication indicator. In at least one approach, the approved transfer cable includes a radio-frequency identification (RFID) transmitter adapted to send an authentication indicator, for example to a controller (e.g., controller 44 of the mobile power supply unit 10). The controller may then determine whether the transfer cable is an approved transfer cable.

If an approved transfer cable does not electrically couple the mobile power supply unit to the portable transfer switch, the controller may not provide, or may inhibit the provision of, electricity from the mobile power supply unit; for example, through the requested electrical port. In an optional approach, the controller may further effect a fault message (for example, at the user interface) in response to the received request for power. The fault message may indicate that an approved transfer cable does not electrically couple the mobile power supply unit to the portable transfer switch.

At step 158, the method may include performing one or more authorization checks. A first authorization check may include determining 160 (e.g., by the controller) whether a key receptacle (e.g., key receptacle 48) at the mobile power supply unit has been actuated. As used herein, a key receptacle may be actuated as a function of a lock cylinder of the key receptacle. For example, a key receptacle may be deactuated when the lock cylinder is in a first position or orientation, and may be actuated when the lock cylinder is in a second position different (e.g., offset from) the first position. That is, the key receptacle may be actuated when the lock cylinder is rotated to a predetermined position, or rotated a predetermined angle of rotation. Rotation of the lock cylinder may be indicative of a user possessing a key corresponding to the key receptacle. In this way, actuation of the key receptacle may indicate that a user is authorized to submit the power request.

A second authorization check may include determining 162 (e.g., by the controller) whether a key receptacle at the portable transfer switch has been actuated. As discussed elsewhere herein, an electrical port at the mobile power supply unit may correspond to a key receptacle at the mobile power supply unit. In this way, the second authorization check may further determine whether the portable transfer switch at which the key receptacle was actuated is electrically coupled to an electrical port corresponding to the key receptacle actuation at the mobile power supply unit.

A third authorization check may include determining 164 (e.g., by the controller) whether a user input corresponds to an authorized input. An authorized input may include one or more of passwords, passcodes, and biometric authentications such as fingerprints that correspond to an authorization input stored in a memory.

In at least one approach, the authorization check 158 includes determinations 160, 162, and 164. In at least another approach, the authorization check 158 includes at least one, but not all, of determinations 160, 162, and 164. In still another approach, the authorization check 158 may be an optional step, and may be omitted entirely such that determinations 160, 162, and 164 are not made.

After the authorization check 158, at step 166, the controller may determine whether the request for power is an authorized request for power. The determination 166 may be in response to determinations 160, 162, and 164.

If the controller determines that the request for power is not an authorized request for power, the controller may not provide, or may inhibit the provision of, electricity from the mobile power supply unit to the portable transfer switch. In an optional approach, the controller may further effect a fault message (for example, at the user interface). The fault message may indicate that the request for power is not an authorized request for power.

If the controller determines that the request for power is an authorized request for power, the method may proceed to optional step 168. At step 168, the controller may receive an operation mode selection, as discussed in greater detail elsewhere herein.

The method may further include the optional step 170 of receiving a request for a quiet mode operation, as discussed in greater detail elsewhere herein.

The method may proceed to step 172 where the controller initiates the provision of power from the mobile power supply unit to the portable transfer switch.

Figure 11:
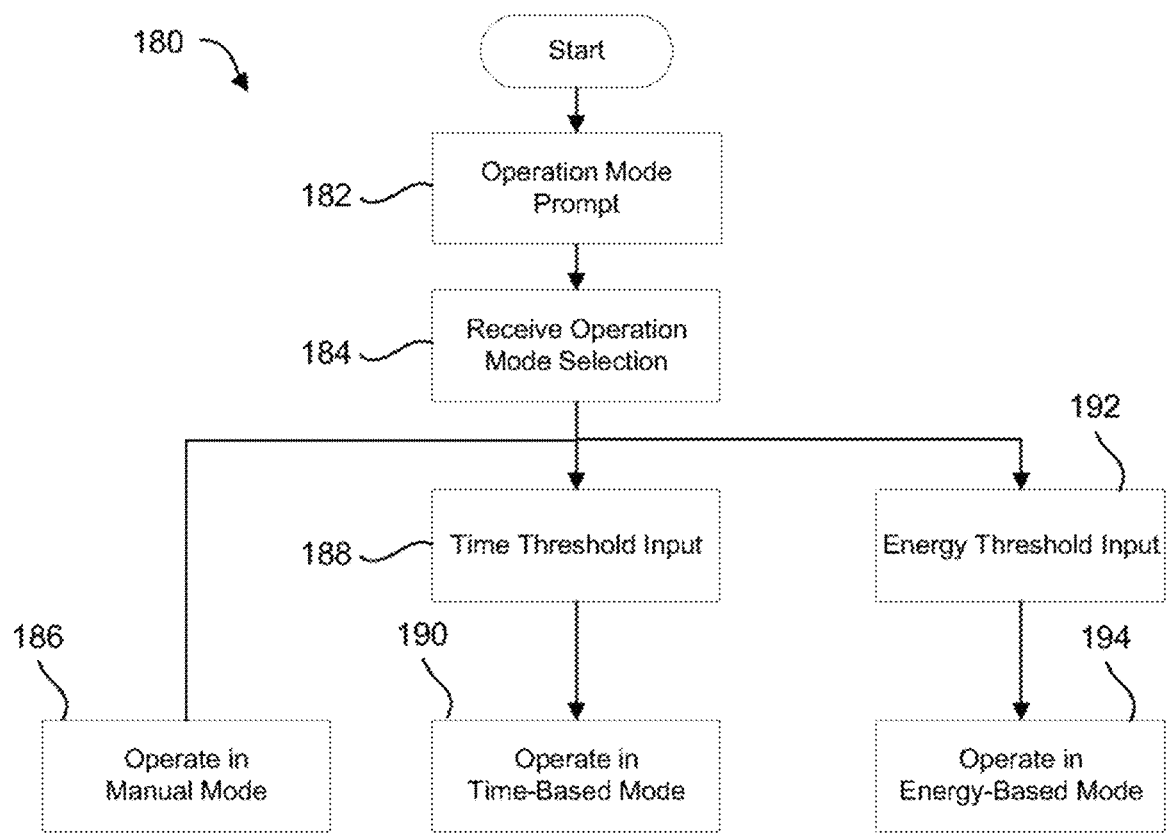
FIG. 11 illustrates a representative operation mode selection routine.

Referring now to FIG. 11, an operation mode selection routine 180 may include initiating 182 an operation mode prompt. The operation mode selection routine may be performed, for example, at step 168 of FIG. 10. In at least one approach, the operation mode prompt may be displayed at a user interface (which may correspond to user interface 22 discussed herein). In still another approach, the operation mode selection routine may not include an operation mode prompt. Instead, the operation mode selection routine may begin at step 184.

At step 186, the method may include receiving a user input, for example, at a user interface. The user input may be a selection at a touch screen. In still another approach, the user input may be a position of a toggle switch. Other user input selection approaches are expressly contemplated.

The user input may be a selection of one of several operation modes. For example, the user input may be a selection of a manual mode, a time-based mode, or an energy-based mode.

In response to receiving a selection of a manual operation mode, the method may proceed to step 184 wherein the controller may be adapted to control the provision of power from a power source until the power source is reduced to a predetermined power level (e.g., 1 gallon or 10% state-of-charge). When the power source is reduced to the predetermined power level, the controller may terminate (and may inhibit) the provision of power from the mobile power supply unit. In still another approach, when operating in the manual operation mode, the controller may be adapted to control the provision of power from the mobile power supply unit until a power source is exhausted. For example, when a battery 30 is the power source, the controller may control the provision of power from the battery 30 until the charge of the battery 30 is exhausted. In still another example, when a generator 32 is the power source, the controller may control the provision of power from the generator 32 until the generator 32 exhausts the fuel supply (e.g., gasoline).

In response to receiving a selection of a time-based operation mode, the method may proceed to step 188 wherein the mobile power supply unit may receive a time threshold input (for example, at the user interface). The time threshold input may be a user-selected period of time (e.g., 10 minutes, 30 minutes, 1 hour, 5 hours, 10 hours, 1 day, 2 days, 1 week, etc.). The method may proceed to step 190 wherein the controller may be adapted to operate the mobile power supply unit in the time-based operation mode. In the time-based operation mode, the controller may be adapted to control the provision of power from a power source for a period of time corresponding to a user-input period of time received at the user interface. In the time-based operation mode, the mobile power supply unit 10 may supply power until the user-selected period of time elapses. In at least one approach, in the time-based operation mode, the mobile power supply unit 10 may supply power until a power source is exhausted before the user-selected period of time elapses, similar to the operation in the manual mode, as previously discussed. In still another approach, when operating in the time-based operation mode, the mobile power supply unit 10 may supply power until a power source is reduced to a predetermined power level (e.g., 1 gallon or 10% state-of-charge) before the user-selected period of time elapses. When the power source is reduced to the predetermined power level, the mobile power supply unit 10 may terminate the provision of power, even if the user-selected period of time has not elapsed.

In response to receiving a selection of an energy-based operation mode, the method may proceed to step 192 wherein the mobile power supply unit may receive an energy threshold input (for example, at the user interface). The energy threshold may be a user-selected energy threshold and may be, for example, 1 kilowatt hour (kWh), 30 kWh, 100 kWh, 300 kWhs, or any suitable energy consumption threshold. The method may proceed to step 194 wherein the controller may be adapted to operate the mobile power supply unit in the energy-based operation mode. In the energy-based operation mode, the controller may be adapted to control the provision of power from a power source until the user-selected energy threshold has been provided, for example, to a specific portable transfer switch. The power transferred to a portable transfer switch 70 may be monitored, for example, by a metering device 56 of the mobile power supply unit 10. In at least one approach, in the energy-based operation mode, the mobile power supply unit 10 may supply power until a power source is exhausted before the user-selected energy threshold is achieved, similar to the operation in the manual mode, as previously discussed. In still another approach, when operating in the energy-based operation mode, the mobile power supply unit 10 may supply power until a power source is reduced to a predetermined power level (e.g., 1 gallon or 10% state-of-charge) before the user-selected energy threshold is achieved. When the power source is reduced to the predetermined power level, the mobile power supply unit 10 may terminate the provision of power, even if the user-selected energy threshold has not been achieved.

Figure 12:
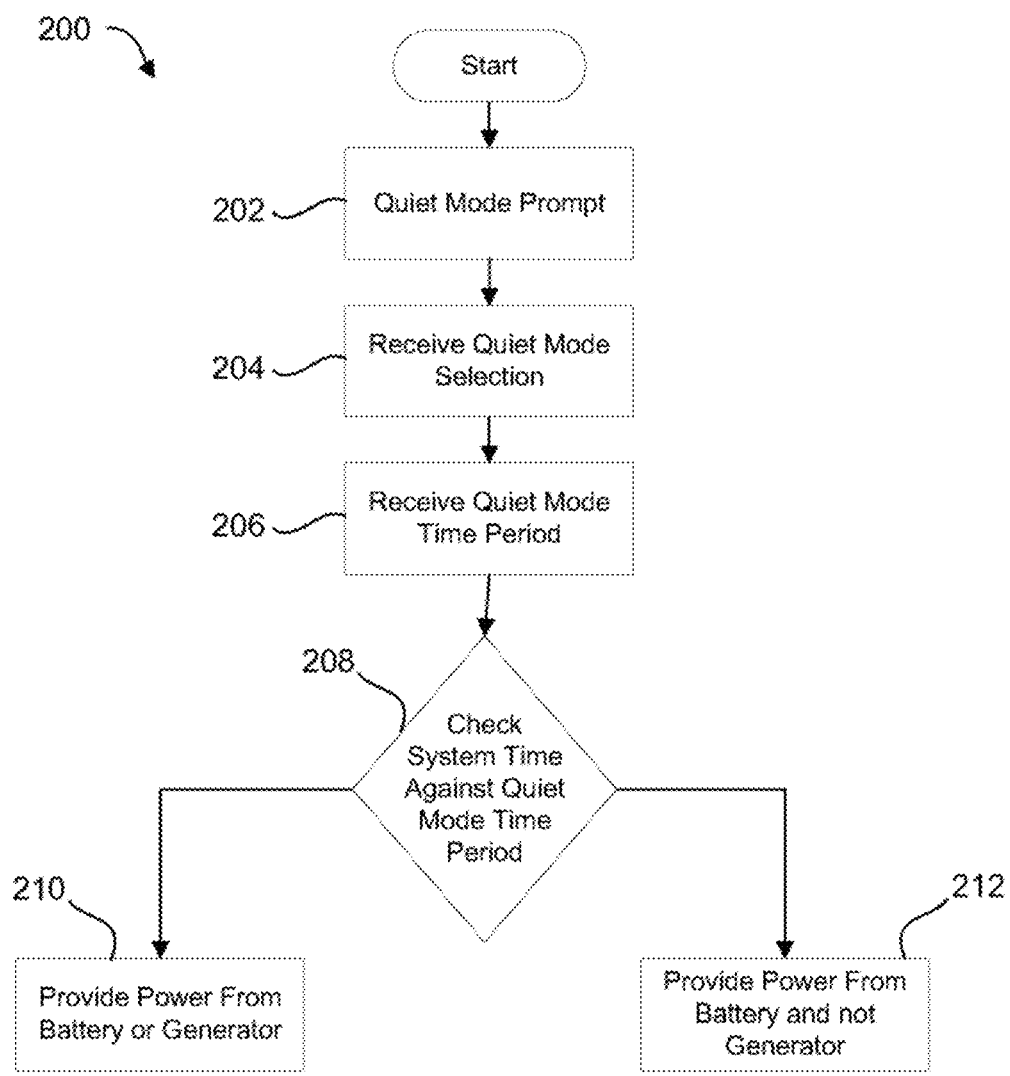
FIG. 12 illustrates a representative quiet mode selection routine.

Referring now to FIG. 12, a quiet mode selection routine 200 may include initiating 202 a quiet mode prompt. The quiet mode selection routine may be performed, for example, at step 170 of FIG. 10. In at least one approach, the quiet mode prompt may be displayed at a user interface (which may correspond to user interface 22 discussed herein). In still another approach, the quiet mode selection routine may not include a quiet mode prompt. Instead, the quiet mode selection routine may begin at step 204.

At step 204, the method may include receiving a quiet mode input, for example, at a user interface. The quiet mode input may be a user input at a touchscreen display. In still another approach, the quiet mode input may be a position of a toggle switch. Other quiet mode input selection approaches are expressly contemplated.

In at least one approach, the quiet mode may be a programmable quiet mode. In this way, the method may include receiving 206 a quiet mode time period. The quiet mode time period may be a time window having a user-input start time and a user-input end time.

At step 208, the method may include checking a system time of the mobile power supply unit against the time window. When a system time of the mobile power supply unit is not within the time window, the method may proceed to step 210, where the controller may be adapted to provide power from at least one of a generator and a battery of the mobile power supply unit to the portable transfer switch.

In at least one approach, the determination of whether to provide power from the generator or the battery when a system time of the mobile power supply unit is not within the time window may be a function of a state-of-charge (SOC) of the battery. The SOC of the battery may be indicative of operational time of the battery (e.g., in seconds, minutes, hours, etc.). In this way, the controller may be adapted to provide power from the battery, and not the generator, when an operational time of the battery is greater than the quiet mode time period. Conversely, when the system time is not within the time window, the controller may be adapted to provide power from the generator, and not the battery, when the operational time of the battery is less than the quiet mode time period.

For example, where a quiet mode time period has a duration of eight hours, and the battery SOC indicates the battery has an operational time of nine hours, the controller may be adapted to provide power from the battery and not the generator. Where a quiet mode time period has a duration of eight hours, and the battery SOC indicates the battery has an operational time of eight hours, the controller may be adapted to provide power from the generator and not the battery. In at least one approach, the controller may provide power from the generator until the system time of the mobile power supply unit is within the time window. In still another approach, the controller may provide power from the generator until the battery SOC achieves a level sufficient to provide battery power for the duration of the quiet mode time period.

When a system time of the mobile power supply unit is within the time window, the method may proceed to step 212, where the controller may be adapted to provide power from the battery and not the generator.

The control strategy disclosed herein may represent control logic that is implemented by a controller 44 using hardware, software, or a combination of hardware and software. For example, the various functions may be performed using a programmed microprocessor. The control logic may be implemented using any of a number of known programming or processing techniques or strategies and is not limited to the order or sequence illustrated. As such, the steps recited herein may be executed in any suitable order and are not limited to the specific order presented herein.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A mobile power supply unit comprising:
   an electronics enclosure including
      an electrical port, and
      a transfer switch electrically connected to an inverter and adapted to provide power through the electrical port;
   a portable transfer switch having a first electrical cable selectively electrically connectable to the electrical port and a second electrical cable selectively electrically connectable with a power receptacle of a building; and
   a non-transitory computer-readable medium having computer-readable instructions stored thereon that are configured to be executed by a processor to:
      at a user interface, receive a request for power and a user-input period of time; and
      responsive to receiving the request for power, the user-input period of time and a first key receptacle at the transfer switch disposed at the mobile power supply unit being in an actuated position, transmit a signal to provide power from the inverter through the transfer switch to the portable transfer switch.

2. The mobile power supply unit of claim 1, further comprising:
   a base;
   a housing including at least one housing member secured to the base and movable relative to the base;
   a generator disposed within the housing; and
   a battery disposed within the housing, wherein the inverter is electrically connected to the generator and the battery.

3. The mobile power supply unit of claim 1 wherein the electronics enclosure further comprises a first authorization input, and wherein the portable transfer switch further comprises a second authorization input.

4. A method of operating a mobile power supply unit having at least one power source, the method comprising:
   at a user interface, receiving a request for power and a user-input period of time; and
   responsive to receiving the request for power, the user-input period of time and a first key receptacle at a first transfer switch disposed at the mobile power supply unit being in an actuated position, transmitting a signal to provide power from the at least one power source through the first transfer switch to a second transfer switch.

5. The method of claim 4 further comprising:
   responsive a second key receptacle at the second transfer switch being in an actuated position, transmitting a signal to provide power from the second transfer switch to a receptacle of an electrical box that is electrically connected to an electrical network of a building.

6. The method of claim 4 further comprising:
   electrically connecting the second transfer switch to the first transfer switch with a first cable; and
   electrically connecting the second transfer switch to a power receptacle of a building with a second cable.

7. The method of claim 6 further comprising:
   responsive to receiving the request for power, providing power from the power source through the first transfer switch to the second transfer switch when the first cable is an approved cable selected from a predetermined list of approved cables.

8. The method of claim 4 further comprising:
   receiving a user authentication input prior to providing power from the power source through the first transfer switch to the second transfer switch.

9. The method of claim 4 wherein the mobile power supply unit is adapted to provide power from the power source for a period of time corresponding to the user-input period of time.

10. A method of operating a mobile power supply unit having at least one power source, the method comprising:
    at a user interface, receiving a request for power and a time window having a user-input start time and a user-input end time; and
    responsive to receiving the request for power and a first key receptacle at a first transfer switch disposed at the mobile power supply unit being in an actuated position, transmitting a signal to provide power from the at least one power source through the first transfer switch to a second transfer switch.

11. The method of claim 10 wherein when a system time of the mobile power supply unit is not within the time window, the mobile power supply unit is adapted to provide power from at least one of a generator and a battery through the first transfer switch to the second transfer switch, and wherein when the system time is within the time window, the mobile power supply unit is adapted to provide power from the battery and not the generator.

12. The method of claim 11 wherein when the system time is not within the time window, the mobile power supply unit is adapted to provide power from the battery when an operational time of the battery is greater than the time period of the time window.

13. The method of claim 12 wherein when the system time is not within the time window, the mobile power supply unit is adapted to provide power from the generator when the operational time of the battery is less than the time period of the time window.

14. A non-transitory computer-readable medium having computer-readable instructions stored thereon that are configured to be executed by a processor to:
    receive a request for power and a time window having a user-input start time and a user-input end time provided at a user interface; and responsive to receiving the request for power and a first key receptacle at a first transfer switch being in an actuated position, transmit a signal to provide power from a power source through the first transfer switch to a second transfer switch.

15. The non-transitory computer-readable medium of claim 14 wherein when a system time of the mobile power supply unit is not within the time window, the mobile power supply unit is adapted to provide power from at least one of a generator and a battery through the first transfer switch to the second transfer switch, and wherein when the system time is within the time window, the mobile power supply unit is adapted to provide power from the battery and not the generator.

16. The non-transitory computer-readable medium of claim 15 wherein when the system time is not within the time window, the mobile power supply unit is adapted to provide power from the battery when an operational time of the battery is greater than the time period of the time window.

17. The non-transitory computer-readable medium of claim 16 wherein when the system time is not within the time window, the mobile power supply unit is adapted to provide power from the generator when the operational time of the battery is less than the time period of the time window.

18. The mobile power supply unit of claim 1 wherein the computer-readable instructions are further configured to be executed by the processor to:
  responsive a second key receptacle at the portable transfer switch being in an actuated position, transmitting a signal to provide power from the portable transfer switch to the power receptacle of the building.

19. The mobile power supply unit of claim 1 wherein the computer-readable instructions are further configured to be executed by the processor to:
  responsive to receiving the request for power, providing power from the inverter through the transfer switch to the portable transfer switch when the first electrical cable is an approved cable selected from a predetermined list of approved cables.

20. The mobile power supply unit of claim 1 wherein the mobile power supply unit is adapted to provide power from the power source for a period of time corresponding to the user-input period of time.

\* \* \* \* \*

UNITED STATES PATENT AND TRADEMARK OFFICE
CERTIFICATE OF CORRECTION

PATENT NO. : 10,910,874 B2
APPLICATION NO. : 16/229451
DATED : February 2, 2021
INVENTOR(S) : Raymond Ellis et al.

Page 1 of 1

It is certified that error appears in the above-identified patent and that said Letters Patent is hereby corrected as shown below:

In the Claims

Column 22, Line 9, Claim 5:
After "responsive"
Insert -- to --.

Column 24, Line 6, Claim 18:
After "responsive"
Insert -- to --.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*